United States Patent [19]
Bryant et al.

[11] Patent Number: 4,674,403
[45] Date of Patent: Jun. 23, 1987

[54] SEMI-AUTOMATIC BALER CONTROL AND INDICATOR SYSTEM

[75] Inventors: Cal L. Bryant, Bartlet, Ill.; Charles A. Parrish, New Holland, Pa.; B. Franklin Griffin, Jr., Alexandria, Va.

[73] Assignee: New Holland Inc., New Holland, Pa.

[21] Appl. No.: 769,913

[22] Filed: Aug. 27, 1985

[51] Int. Cl.$^4$ .............................................. B65B 13/04
[52] U.S. Cl. ........................................ 100/4; 56/341; 100/5; 100/48; 100/88; 100/99
[58] Field of Search ...................... 100/4, 5, 13, 88, 99, 100/43, 48; 56/341, 343

[56] References Cited

U.S. PATENT DOCUMENTS

| | | | |
|---|---|---|---|
| 3,513,464 | 5/1970 | Yarbro | 100/99 X |
| 3,722,197 | 3/1973 | Vermeer | 56/341 |
| 3,848,526 | 11/1974 | Mast | 100/88 |
| 4,035,999 | 7/1977 | Crane et al. | 56/341 |
| 4,167,844 | 9/1979 | Freimuth et al. | 56/343 |
| 4,246,743 | 1/1981 | Anstee et al. | 56/341 |
| 4,253,389 | 3/1981 | Campbell et al. | 100/5 |
| 4,354,429 | 10/1982 | Boldenow et al. | 100/5 |
| 4,402,176 | 9/1983 | Arnold | 100/88 X |

FOREIGN PATENT DOCUMENTS

| | | | |
|---|---|---|---|
| 0115995 | 8/1984 | European Pat. Off. | 100/5 |
| 0117817 | 9/1984 | European Pat. Off. | 100/5 |
| 2153293 | 8/1985 | United Kingdom | 56/341 |

Primary Examiner—Billy J. Wilhite
Attorney, Agent, or Firm—Griffin, Branigan & Butler

[57] ABSTRACT

A round baler having a single bale forming chamber is provided with an electronic control circuit which makes its operation automatic except for the operator-controlled functions of starting and stopping forward motion of the baler. Under the circuit control the baler forms a bale, wraps it with twine, cuts the twine, raises the tailgate, ejects the wrapped bale and closes the tailgate. The control circuit energizes a first indicator when the tailgate closes to signal the operator to begin forward motion of the baler. When a point is reached in the bailing cycle at which the wrapping of the bale is to commence, the circuit energizes a second indicator to signal the operator to stop forward motion of the baler. The circuit also detects certain malfunctions and energizes a third indicator to signal the operator that a malfunction has occurred.

9 Claims, 7 Drawing Figures

SEMI-AUTOMATIC BALER CONTROL AND INDICATOR SYSTEM

RELATED ART

This application incorporates by reference the subject matter of U.S. Pat. Nos. 3,848,526, 4,167,844 and 4,253,389.

BACKGROUND OF THE INVENTION

1. Field of the Invention

The present invention relates to "rotary" or "round" baling machines of the type used to form "round" or cylindrically shaped bales of hay or like crop material. More particularly, the present invention provides an electronic monitoring and control system for semi-automatically controlling a baling machine, the system providing visual and/or audible signals to the operator which prompt him as to the status of the bailer and the action to be taken by him.

2. The Prior Art

Round balers of the prior art may generally be classified as one of two types, that is, non-automatic or automatic. Non-automatic balers are typified by Vermeer U.S. Pat. No. 3,722,197. These balers are characterized by the fact that they have a single bale forming chamber and an operator must manually control all operations such as stopping the forward motion of the baler and the tractor towing it, initiating and then stopping the wrapping operation which wraps twine around the rolled bale, and opening and closing a rear gate, the opening of the gate permitting the rolled and wrapped bale to be ejected from the rear of the baler. Furthermore, the operator must maintain a watch over the baler so that he may stop the forward motion when it is time to wrap a bale. This is difficult and tiresome for an operator who is sitting in the tractor pulling the baler since he must also look forwardly of the tractor to insure that he steers it along the windrow of the material being baled.

More recently, continuous automatic round balers have been developed which do not require that the forward motion of the baler be stopped after each bale is rolled. These balers, as exemplified by Crane et al. U.S. Pat. No. 4,035,999 are provided with two bale-forming chambers. The rolling of one bale is initiated in a forward bale-forming chamber while a previously formed bale is wrapped with twine in a rear chamber and then ejected through a rear gate. When the gate is closed a partially rolled bale in the foward chamber is transferred to the rear chamber where the rolling is completed prior to wrapping and then rearwardly ejecting the wrapped bale. The operation is continuous and, absent malfunction, requires no intervention by the operator.

While the automatic balers represent a great advance over the non-automatic balers of the prior art, the automatic balers are much more expensive and have many more parts thus increasing the possibility of breakdown. Furthermore, automatic balers still require that the operator keep watch over the baler operation to insure that there is no malfunction.

Some attempts have been made to provide non-automatic balers with features which eliminate some of their disadvantages and tend to make their operation more automatic. For example, Boldenow et al. U.S. Pat. No. 4,354,429 provides an electronic circuit for controlling the wrapping of twine around a bale. The wrapping operation is initiated by manual actuation of a switch by the operator after which the circuit controls the wrapping apparatus and terminates its operation when the wrapping is completed. Anstee et al. U.S. Pat. No. 4,246,743 discloses that a switch may be located on a baler to close a contact completing a circuit to a visual and audible indicator to thereby signal the operator that a full bale has been rolled and the tractor should be stopped while the bale is wrapped. However, to Applicant's knowledge there does not exist in the art a semi-automatic baler wherein the only manual operation required by the operator is stopping and starting forward motion of the baler and wherein visual and/or audible indicators are provided in the vicinity of the operator to indicate malfunctions and the progress of the baling operation.

BRIEF SUMMARY OF THE INVENTION

An object of the present invention is to provide a semi-automatic baler having a single bale forming chamber and requiring no manual controls other than starting and stopping the forward motion of the baler.

An object of the present invention is to provide a control circuit for a semi-automatic baler, said control circuit automatically controlling the bale rolling, bale wrapping and bale ejection functions.

An object of the present invention is to provide a plurality of sensors for sensing various conditions occuring during operation of a single chamber round baler, a plurality of indicators located in the vicinity of the operator of the baler, and a control circuit responsive to the sensors for controlling certain operations of the baler and energizing the indicators to thereby indicate to the operator the status of the baling operation, the arrangement being such that the only operator action required is the starting and stopping of the forward motion of the baler.

Another object of the invention is to provide a plurality of sensors for sensing various operating conditions in a baler, a plurality of indicators for indicating to an operator the condition or status of the baler, and a circuit responsive to the sensors for operating the indicators to indicate the progress of a baling operation and the presence of a problem when there is a malfunction of the baler.

The above-stated and other objects of the invention are accomplished by providing a plurality of sensors disposed at various locations on a baler for sensing various states of operation of the baler. An indicator panel and control box including electronic circuitry is disposed in the vicinity of the operator, the indicator panel including an audible indicator as well as visual indicators readily visible from the operator's seat. The electronic circuitry is connected to the sensors and drives the indicators as various conditions are sensed during operation of the baler. The electronic circuitry is also connected to actuators on the baler to initiate operation of various elements of the baler in sequence to start a wrapping operation to wrap a rolled bale, terminate the wrapping operation, cut the wrapping twine, open the rear gate, eject the wrapped bale, close the rear gate, and initiate the rolling of a new bale. Each time the rear gate is closed a sensor energizes the control circuit to activate an indicator which signals the operator to begin forward motion of the baler and each time a full bale has been formed a sensor detects this condition and applies a signal to the control circuit to inform the operator that forward motion of the baler must be stopped. The sensors also detect, and the indicators indicate, various malfunctions such as a broken wrapping twine, an exhausted twine supply, failure to cut a wrapping twine and interference with rear gate closure by an incompletely ejected bale.

Other objects of the invention and its mode of operation will be better understood from the following description and the accompanying drawings.

DETAILED DESCRIPTION OF A PREFERRED EMBODIMENT

Figure 4:
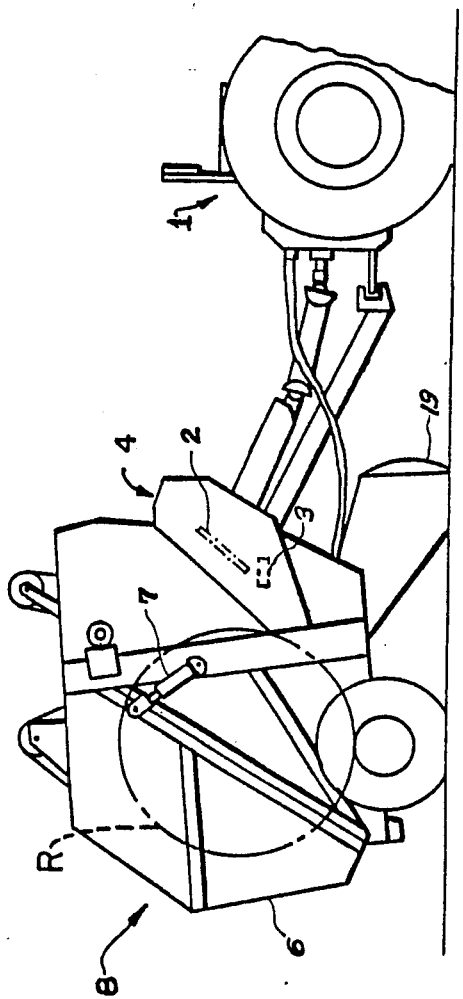
FIG. 4 schematically illustrates a round baler of the prior art.

Typical Prior Art Baler —FIG. 4

The present invention may be used with different round balers of the prior art and the tailgate actuator means 18 and twine tube drive means 16 may take different forms. For the purpose for illustrating the invention the following description assumes that the control system is associated with a round baler of the type illustrated in FIG. 4. The baler 8 shown in FIG. 4 is described in detail in Mast U.S. Pat. No. 3,848,526 and is provided with a crop pickup 19 into which the crop is fed as a tractor 1 pulls the baler along a windrow. The corp material entering the pickup 19 is fed into a bale forming chamber where it is rotated or rolled into a bale R, the size of the bale increasing as more crop material is added to the rotating bale.

After a nearly full bale has been formed, it is wrapped with twine before it is ejected from the baler. A twine wrapping mechanism 4, which may be of the type illustrated in Freimuth et al. U.S. Pat. No. 4,167,844, includes a pair of twine dispensing tubes schematically illustrated at 2. The twine tubes are normally in an up position but upon actuation they move downwardly and to the left as viewed in FIG. 4 so that twines dangling from the ends of the tubes are caught up and wrapped into the rotating bale with incoming crop material. As the rotating bale is wrapped, the twine tubes move back to their starting position and as this occurs a twine severing means 3 cut each twine. The twine wrapping mechanism may be driven by an electric motor or an electrically actuated hydraulic motor as suggested in Campbell et al. U.S. Pat. No. 4,253,389.

After the bale has been wrapped or tied it may be ejected from the bale forming chamber is explained in the aforementioned patent to mast. For this purpose the baler is provided with a rear or tailgate 6 which is pivoted at its top portion so that it opens as it swings clockwise as viewed in FIG. 4. An electrically controlled hydraulic actuator 7 is positioned at each side of the tailgate to control its movement. When the tailgate is opened, the bale is ejected or falls out of the baling chamber onto the ground behind the baler.

Typical Prior Art Baler —FIG. 4

The present invention may be used with different round balers of the prior art and the tailgate actuator means 18 and twine tube drive means 16 may take different forms. For the purpose of illustrating the invention the following description assumes that the control system is associated with a round baler of the type illustrated in FIG. 4. The baler 8 shown in FIG. 4 is described in detail in Mast U.S. Pat. No. 3,848,526 and is

Figure 1:
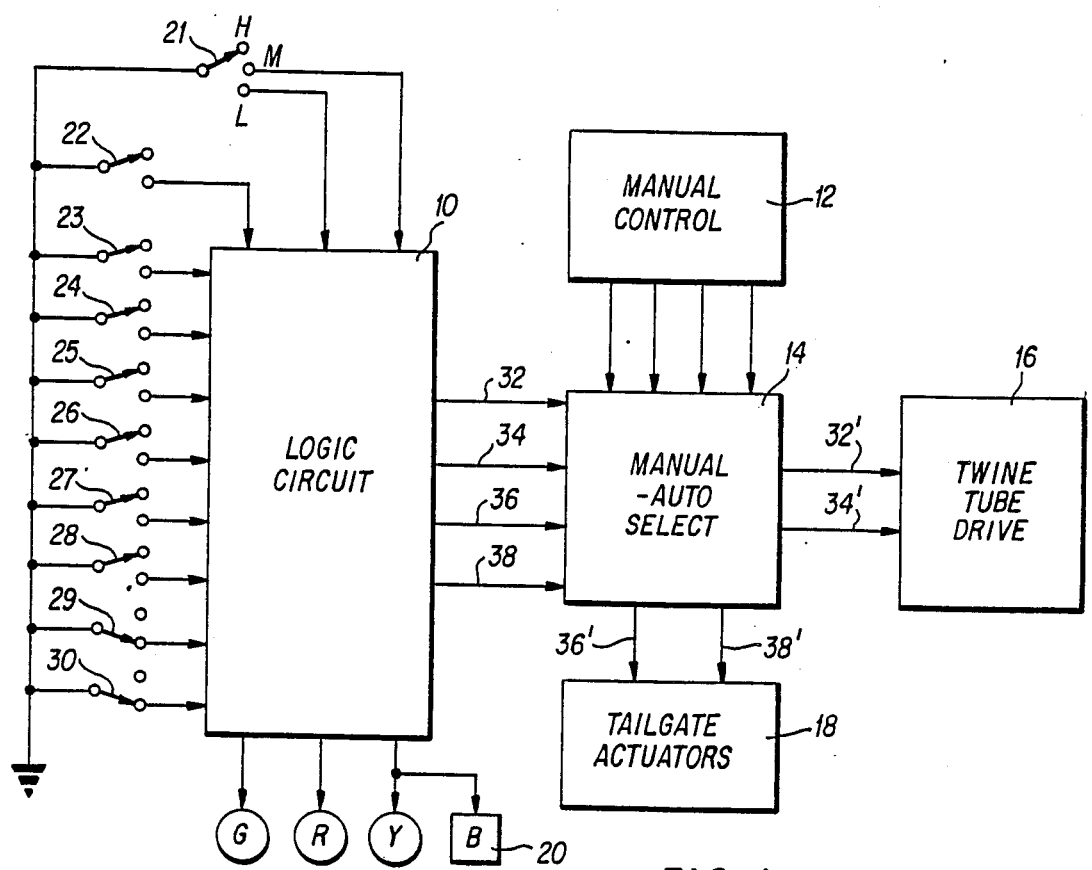
FIG. 1 is a circuit diagram showing the controls for a round baler.

Control System —FIG. 1

As illustrated in FIG. 1, a semi-automaic round baler control system constructed in accordance with the principles of the present invention comprises a logic circuit 10, a set of manually actuated controls 12, a set of selector switches 14, a twine tube drive means 16, tailgate actuator means 18, green (G), red (R) and yellow (Y) indicators, an audible alarm 20 and a plurality of switches 21–30. The logic circuit 10 responds to selective actuation of switches 21–30 to produce an output signal on one of two leads 32 and 34 for controlling the twine tube drive means 16. Logic circuit 10 also responds to actuation of switches 21–30 to produce an output signal on one of two leads 36 and 38 for controlling the tailgate (rear gate) actuator means 18.

The manual controls 12 comprise the well-known operator-actuated controls for controlling the twine tube drive means and the tailgate actuator means 18. The selector switches 14 are located adjacent the operator and are used to select the output of the manual controls 12 or the output of logic circuit 10 as the source of signals for controlling the twine tube drive means and the tailgate actuator means. The switches 14 thus permit the baler to be operated semi-automatically under the control of logic circuit 10 or, alternatively, non-automatically under manual control of the operator. Electric signals produced on leads 32' and 34' by either the logic circuit 10 or the manual controls 12 are used to control the twine tube drive means 16.

Figure 2D:
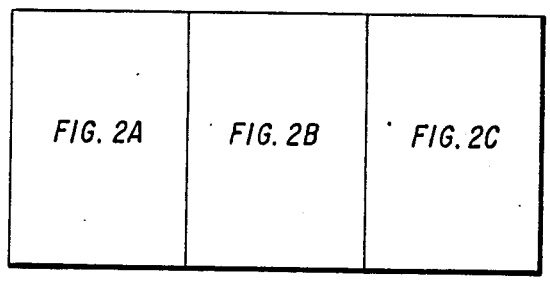
FIGS. 2A–2C, when arranged as shown in FIG. 2D, comprise a schematic logic diagram of an electronic control circuit constructed in accordance with the principles of the present invention.
Figure 2A:
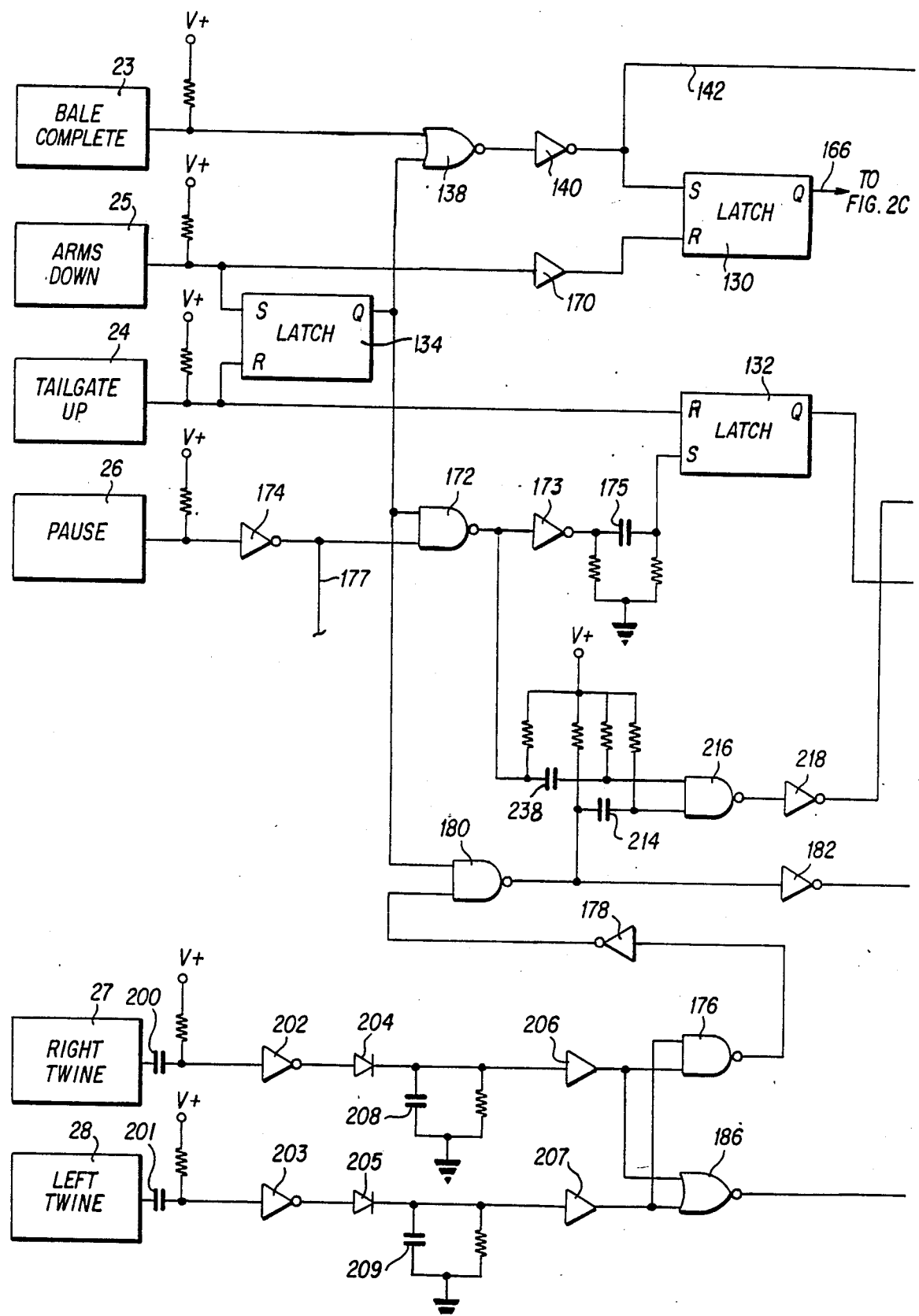
Figure 2B:
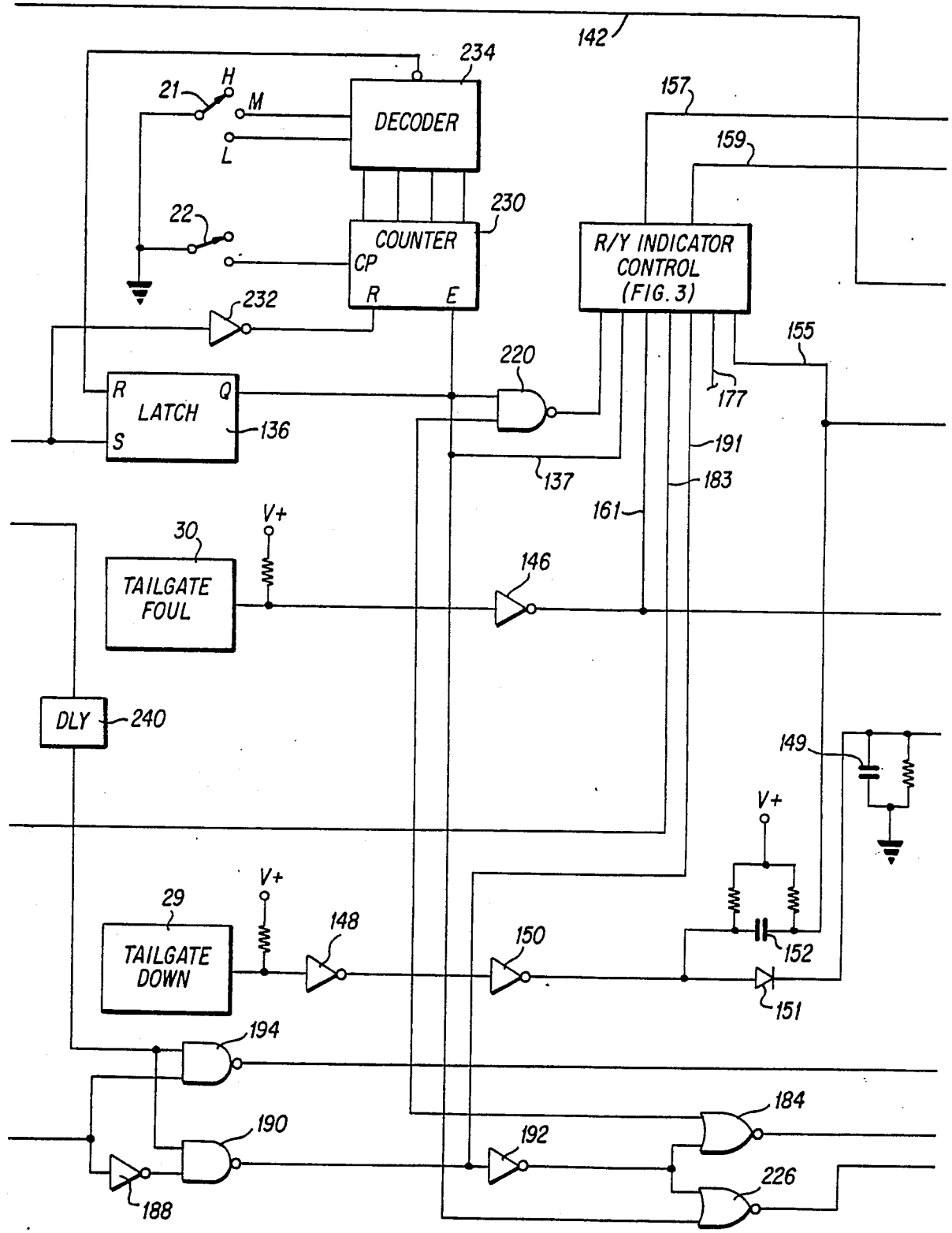
Figure 2C:
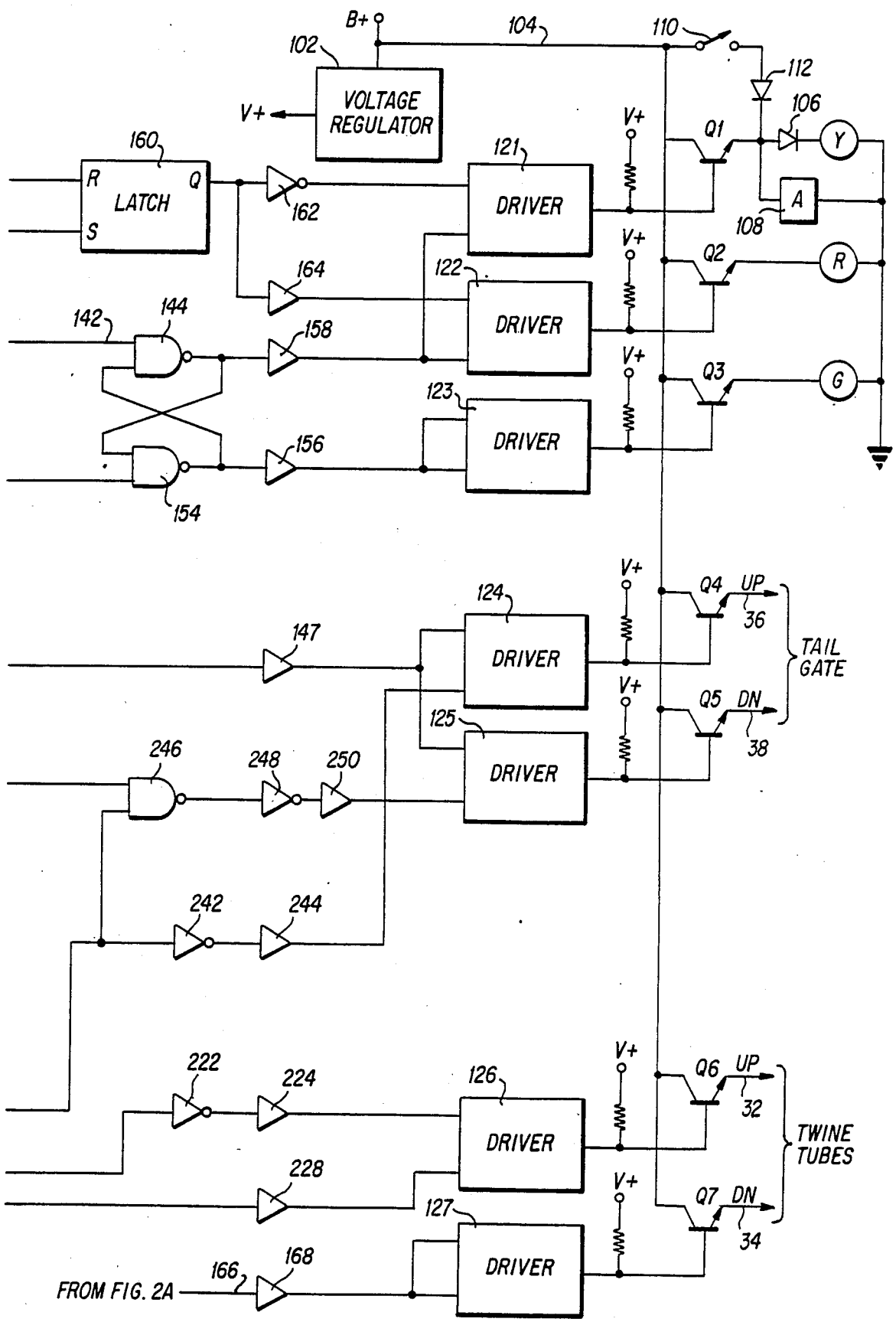

The switch 21 is a three-position manually actuated switch mounted near the operator of the tractor which pulls the baler. As subsequently explained, the operator sets this switch to select the number of circular wraps of twine to be made around the bale. The switches 22–30 may be mechanical or Hall effect switches and are mounted at various positions on the baler as subsequently described to sense various conditions or events occurring during operation of the baler. The switches are all connected to ground (logic 0) at one side so that a logic 0 input signal is applied to logic circuit 10 when a switch is closed. The other side of each switch is connected to V+ as shown in FIGS. 2A–2C so that a V+ (logic 1) signal is applied to the logic circuit when a switch is open. FIG. 1 illustrates the normal state of switches 22–30 when the baler is ready to begin a baling operation.

In addition to controlling the twine tube drive means 16 and the tailgate actuator means 18, the logic circuit 10 also selectively controls the visual indicators G, R and Y and the audible alarm 20. When the G indicator is lit it signals the operator that he may put the tractor in gear to pull the baler forward. The R indicator signals the operator to stop forward motion of the tractor The Y indicator and the audible alarm 20 are actuated together and signal the operator that some action on his part is, or will soon be, required.

FIGS. 2A–2C illustrate the details of the logic circuit 10. The logic circuit may be powered from a battery which also powers the ignition system of a tractor which pulls the baler. The battery is connected to a voltage regulator 102 (FIG. 2c) which provides a regulated output voltage (V+) for the logic circuits subsequently described. A lead 104 connects B+ to the collectors of a plurality of transistors Q1-Q7 which drive various indicators and provide signals for controlling the twine tube drive means 16 and the tailgate actuator means 18.

The emitter of transistor Q1 is connected to ground through a diode 106 to a yellow visual indicator light Y and a buzzer, beeper, bell or other audible alarm 108 while the emitters of transistors Q2 and Q3 are connected to ground through red and green visual indicators R and G, respectively. The visual indicators are positioned on a panel so as to be readily visible to the operator during the baling operation. A normally open test switch 110 is connected in series with a diode 112 which is in turn connected to audible alarm 108 and diode 106. By closing switch 110 the operator may verify that the alarm 108 and the indicator Y are functioning properly. The G, Y and R indicators and audible alarm 108 comprise a prompter means which continuously indicates to the operator that he should go forward, prepare to stop, stop and wait, or correct a problem.

The round baler illustrated in Mast FIG. 4 and U.S. Pat. No. 3,848,526 is provided with a pair of hydraulic cylinder and piston units 7, one at each side of the frame, for raising and lowering the tailgate. The cylinder and piston units are both powered by a gear pump driven from the main drive shaft of the baler. Two solenoid valves are interposed between the gear pump and the cylinders and in accordance with the present invention the solenoids of these valves are driven by output signals from transistors Q4 and Q5, respectively. When transistor Q4 is turned on the current flow through lead 36 operates one of the solenoid valves to extend both pistons and raise the tailgate so that a bale may be ejected. When transistor Q5 is turned on current flow over lead 38 operates the other solenoid valve and retracts both pistons so that the tailgate is lowered to its closed position.

The preferred embodiment of the present invention is adapted to control a round baler having a bale wrapping mechanism with two twine dispensing tubes as disclosed, for example, in U.S. Pat. Nos. 4,253,389 or Freimuth et al. 4,167,844 and having an electric motor or electrically controlled hydraulic motor for raising and lowering the tubes. Transistors Q6 and Q7 provide output signals on leads 32 and 34 for actuating the motor to drive the twine tubes up or down, respectively.

The transistors Q1-Q7 have their bases connected to the outputs of a plurality of AND-drivers 121-127, respectively. The drivers 121-127 are controlled by a logic circuit which is driven by output signals from the switches 23-30. When all inputs of any driver are at the logic 1 level it produces an output signal to turn on the transistor that is connected to its output.

The bale complete switch 23 (FIG. 2A) is positioned to sense the condition of an upper apron defining the bale-rolling chamber. As described in the aforementioned Mast patent, the upper apron partially defines a bale-rolling or bale-forming chamber which gets progressively larger as a bale is formed. To take up the slack in the apron when the roll is less than complete, two oppositely extending arms are provided. The switch 23 may be positioned to sense the location at which one of these arms will be when a full bale has been formed. The bale complete switch closes to produce a logic 0 output signal only when there is a full bale in the bale-forming chamber.

Figure 3:
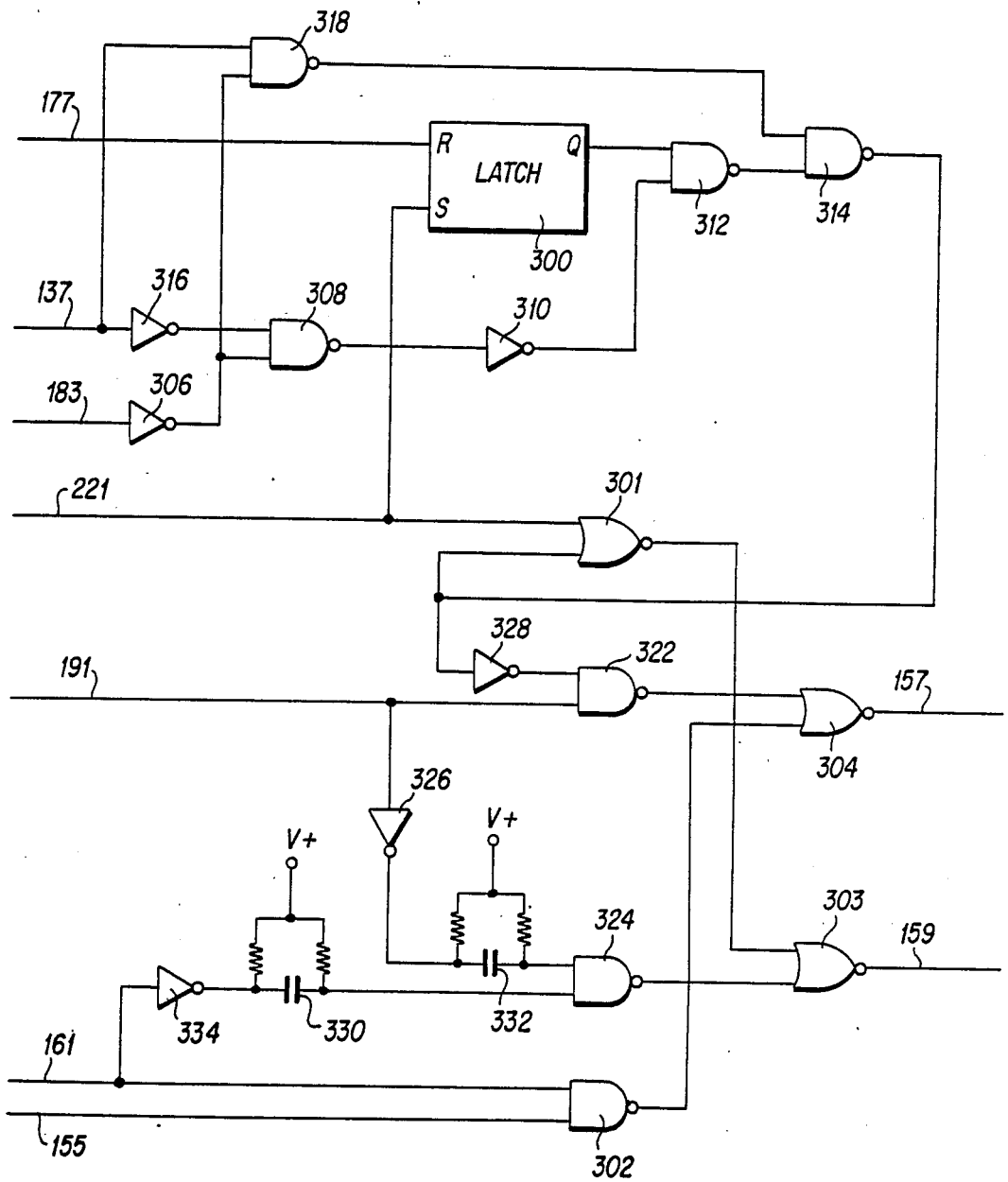
FIG. 3 shows the red/yellow indicator controls.

The tailgate up switch 24 is positioned to sense one of the tailgate frame members 32 of the Mast patent and produces a logic 0 output signal when the tailgate is fully opened as illustrated in FIG. 3 of the patent. The tailgate down switch 29 (FIG. 2B) is also positioned to sense the position of a tailgate frame member. It produces a logic 0 output signal when the tailgate is fully closed as illustrated in FIG. 1 of the Mast patent.

The tailgate illustrated in the Mast patent may be provided with a spring loaded bar, the spring being compressed if the bar should strike an incompletely ejected bale as it moves toward its closed position. The tailgate fouled switch 30 is mounted to sense movement of the spring loaded bar relative to the remainder of the tailgate. The switch produces a logic 0 output signal as long as the tailgate is not fouled.

As previously stated, the present invention is suitable for use in a round baler forming apparatus having a twine wrapping apparatus as described in U.S. Pat. Nos. 4,253,389 or 4,167,844 for wrapping a rolled bale with twine. The wrapping apparatus includes a pair of twine tubes through which twine is dispensed to "tie" a rolled bale. The tubes are normally up but after a full bale has been rolled the tubes are moved downwardly and toward the center of the roll so that the end of each twine may be caught up in the roll and wrapped around it. The arms down switch 25 (FIG. 2A) is positioned adjacent the path of a member forming part of the twine tube drive mechanism and produces a logic 0 output signal when the tubes reach their "down" or lowermost position.

When the twine tubes reach the "down" position, they pause for an interval of time sufficient to enable the ends of the two twines, dangling from their tubes, to be caught up in the roll and circularly wrapped several times around the central portion of the bale. After a predetermined number of circular wraps have been made around the central portion of the bale the tubes begin moving back toward the "up" or home position, the bale being rotated so that the twines are helically wound around the bale from its central portion toward each end. Near each end the twine tubes are again stopped to wrap a predetermined number of circular wraps of twine around each end of the bale. In accordance with the present invention the pause switch 26 is positioned to sense some portion of the twine tube drive mechanism and produce a logic 0 output signal when the tubes are in a position to wrap a predetermined number of circular turns of twine around each end of the bale. When the pause switch 26 produces an output signal the twine tubes are stopped until the predetermined number of wraps has been made. After the circular end wraps have been completed the twine tubes resume their upward movement and immediately trip a pair of knives to cut the twine. The twine tubes stop and a mechanism is actuated to open i.e. raise, the tailgate.

The right and left twine sensor switches 27 and 28 are positioned to sense motion of the right and left twines, respectively, and produce an output signal if the twine should break, the supply of twine should be exhausted, or the twine is not cut by the knives at the end of a wrapping cycle.

In addition to the sensor signals described above, the logic circuit of FIGS. 2A-2C also receives input signals from the manually actuated wrap selector switch 21 and the wrap counter switch 22. The switch 21 is a selector switch for manually selecting, for example, 10, 16 or 30 as the number of circular turns of a twine to be wrapped around a bale at its center and near each end. The wrap-counter switch 22 may be positioned to sense any mechanism on the baler which will provide an indirect indication of the number of times a bale has been rotated in the roll forming chamber of the baler. Thus, the switch 22 may be positioned to sense the number of revolutions of the floor chain drive shaft (74 of Mast) or it may sense the length of twine dispensed.

The operation of the logic circuit of FIGS. 2A-2C may best be understood by considering a normal sequence of operations of the bale forming machine. Assume that the baler is empty, its tailgate is down (closed), and the arms of the twine dispensing mechanism are in the home or "up" position. When the operator turns on the ignition system of the tractor B+ is applied to voltage regulator 102 and the output of the voltage regulator provides power to the logic circuits. When power is applied to the logic circuits six latches 130, 132 and 134 (FIG. 2A), 136 (FIG. 2B), 160 (FIG. 2C) and 300 (FIG. 3) assume the reset state so that their Q outputs are at the logic 0 voltage level. The switches 23-30 are in the state shown in FIG. 1.

As shown in FIGS. 2A-2B one side of each of the switches 23-28 is tied through a resistor to +V. Since each of these switches is assumed to be open, a logic 1 signal is applied to the logic circuit from each of these switches. The logic 1 signal from bale complete switch 23 passes through a NOR 138 and an inverter 140 to the set input of latch 130. The logic 1 signal has no effect on the latch since all latches are set or reset by a negative-going signal applied to the set or reset input, respectively. The output of inverter 140 is also applied over a lead 142 to enable one input of a NAND 144.

When power is turned on the logic 0 signal from the tailgate down switch 29 is inverted by an inverter 148, inverted again by an inverter 150, and passed through a capacitor 152 to block input of a NAND 154. The NANDs 144 and 154 are cross coupled to form a flip-flop. When the pulse passing through capacitor 152 drives the output of NAND 154 to logic 1, both inputs of NAND 144 are enabled. The output of NAND 144 then blocks one input of NAND 154 to thus maintain NAND 154 off and 144 on. The logic 1 output of NAND 154 is applied through an amplifier 156 to both inputs of driver 126. The driver produces an output signal to turn on transistor Q3 and illuminate the green indicator G.

When power is turned on the pulse which is applied through capacitor 152 to NAND 154 also passes over lead 155 to the red/yellow indicator control circuit 157, the details of which are shown in FIG. 3. In FIG. 3, the pulse blocks a NAND 302. The output from the NAND drives the output of NOR 304 to logic 0 and the negative-going output of NOR 304 passes over lead 157 to reset latch 160. The output of the latch is applied through an inverter 162 and an amplifier 164 to the drivers 121 and 122, respectively, thereby enabling one input of driver 121 and blocking driver 122. The logic 0 output of NAND 144 passes through an amplifier 158 and blocks drivers 121 and 122 so that the red and yellow indicators are not illuminated. However, the operator may check the operation of the yellow indicator and the audible alarm at this time by momentarily closing switch 110. As will be evident from the subsequent description, the states of switches 23-30 and latches 130, 132, 134 and 136 under the assumed conditions are such that drivers 124-127 are all blocked so that no signals are produced to drive the tailgate or the twine tubes.

The green indicator signals the operator that he may put the tractor in gear to pull the baler along a windrow. As the baler moves along the windrow the baler gathers crop material and rolls it within the bale forming chamber to form a bale. When a bale of a predetermined size has been formed this condition is sensed by the bale complete switch 23. The switch produces a logic 0 signal which passes through NOR 138 and inverter 140 to NAND 144. The output of NAND 144 goes to logic 1 and enables one input of NAND 154. The second input of NAND 154 is tied to V+ so the output of NAND 154 goes to logic 0 thereby blocking driver 123. This turns transistor Q3 off thereby extinguishing the green indicator.

At the time the green indicator is turned off, the yellow indicator is turned on and the buzzer 108 sounded to alert the operator that he should be prepared to soon stop forward motion of the tractor. The logic 1 output of NAND 144 passes through amplifier 158 and enables one input of drivers 121 and 122. The second input of driver 121 is already enabled by the output of latch 160 as previously explained. The driver 121 is turned on and its output turns on transistor Q1 to energize the yellow indicator Y and the alarm 108 as signals to the operator that he will soon be required to stop the forward motion of the tractor.

In addition to turning off the green indicator and turning on the yellow indicator, actuation of the full bale switch 23 also controls initiation of movement of the twine tube arms. In FIG. 2A, the logic 0 output signal from the bale complete switch 23, acting through NOR 138 and inverter 140, sets the latch 130. The resulting logic 1 output signal from latch 130 is applied over a lead 166 to an amplifier 168 (FIG. 2C) whose output is connected to driver 127. The output signal from driver 127 turns on transistor Q7 so that current flows from B+through the transistor Q7 and over lead 34 to energize the motor for driving the twine tubes down.

When the twine tubes reach the down position they are sensed by the arms down switch 25. The switch produces a logic 0 output signal which passes through an amplifier 170 to reset latch 130. This turns off transistor Q7 and deenergizes the twine tube motor. The output signal from switch 25 also sets latch 134 which produces a logic 1 signal that passes through NOR 138 and inverter 140 to NAND 144 and the set input of latch 130. This insures that NAND 144 will be enabled and latch 130 will remain reset even though there may be a "bouncing" of the bale complete switch 23 as rotation of the bale continues. When latch 134 is set its output also enables one input of two NANDs 172 and 180 but the second inputs of these NANDs are at the logic 0 level. The pause switch 26 is open hence the output of inverter 174 blocks NAND 172. The twines are not moving so the output of NAND 176, acting through inverter 178, is blocking NAND 180.

At this time the tractor is still moving forward and crop material is being added to the bale as it is rotated in the bale forming chamber. The twine tubes are down and the loose ends of the right and left pieces of twine are dangling in front of the central portion of the rotating bale where they can be caught up and wrapped into the bale with newly added crop material. Nothing further happens in the logic circuit until the twine motion switches 27 and 28 sense that both the right and left twines have begun movement as a result of being caught up in the rotating bale. When the right twine begins movement the switch 27 produces a logic 0 output signal which is differentiated by a capacitor 200 and passed through an inverter 202, diode 204 and amplifier 206 to a first input of NAND 176 and a NOR 186. Since the twine moves intermittently or with a jerking movement, the output of the switch 27 intermittently drops to logic 0. The resulting logic 1 level output of inverter 202 charges a capacitor 208 which then discharges through amplifier 206 during short intervals when the twine does not move. This insures that one input of NAND 176 and NOR 186 is enabled even during short intervals when the right twine does not move at the point where its motion is sensed.

The arrangement for the left twine motion switch 28 is the same as that for the right twine motion switch 27. Therefore, NAND 176 produces a logic 0 output signal if both twines are in motion and NOR 186 produces a logic 0 output signal if either twine is in motion. When both twines begin moving the output of NAND 176 goes to logic 0 and the signal passes through an inverter 178 to enable NAND 180.

When the twines start moving the operator should stop forward motion of the tractor so that no more crop material is fed into the bale forming chamber while the bale is being wrapped with twine. When both twines begin moving and the output of NAND 180 goes to logic 0, the signal is passed through an inverter 182 and applied to one input of a NAND 220. The output of NAND 180 also passes through a capacitor 214 to block NAND 216. The output of NAND 216 is inverted and applied to the set input of latch 136. When latch 136 is set its output enables a second input of NAND 220. The NAND produces a negative-going output signal on lead 221 which is applied to one input of NOR 301 (FIG. 3) and the set input of latch 300. As subsequently explained, the second input of NOR 301 is at logic 0 except when a malfunction is detected. Therefore, the negative going signal on lead 221 sets latch 300 and passes through NOR 301 to NOR 303. The output lead 159 from NOR 303 is connected to the set input of latch 160 so latch 160 is set thereby turning off the audible alarm and yellow indicator, and turning on the red indicator as a signal to the operator that he should immediately stop forward motion of the tractor.

Even after forward motion of the tractor and baler is stopped, the baler continues to rotate the bale that has been formed so that the bale may be wrapped with the twine. The twine tubes must remain in their down position so that a preselected number of circular turns may be wrapped around the center of the bale. The number of turns wrapped around the center of the bale is determined by manually actuated switch 21 which is set by the operator to select, by way of example, either 10, 16 or 30 turns. A counter 230, which may comprise two series connected decade counters, counts the number of turns.

The twine tubes should not move while the circular wraps of twine are being wrapped around the bale. At the time both twines begin moving the output of NAND 180 passes through inverter 182, NOR 184, inverter 222 and amplifier 224 to enable one input of driver 126. However, at the same time the output of NAND 180 sets latch 136 as described above and the logic 1 output of latch 136 acts through NOR 226 and amplifier 228 to block the second input of driver 126 and prevent upward movement of the twine tubes.

The latch 136 controls the wrap counter 230 to count the number of circular wraps. As the output of NAND 180 sets the latch 136 the signal also passes through an inverter 232 and resets counter 230 while the output of latch 136 enables the counter to begin counting.

A decoder 234 is provided for detecting when the twine wrap counter has reached a predetermined count. The decoder is connected to the manual selector switch 21 and produces a logic 0 output to reset latch 136 when the count in the counter reaches 10, 16 or 30, depending upon whether the switch 21 is set to low, medium or high.

As previously explained, the wrap counter switch 22 is positioned to indirectly indicate when a twine has been wrapped once around a bale at a given position on the bale. The switch 22 closes once for each turn of a twine around the bale and each time it closes it applies a pulse to counter 230 to increment the count therein.

After the predetermined number of wraps have been made around the central portion of the bale, the twine tubes should begin their upward movement. When the output of decoder 234 resets latch 136 the logic 0 output of the latch is applied to NOR 226. The second input of NOR 226 is always at logic 0 unless the knives should fail to cut both twines at the end of a wrapping sequence as subsequently described. Therefore, when latch 136 is reset NOR 226 produces an output signal which passes through amplifier 228 to enable driver 126 and drive the twine tubes upwardly. As the twine tubes move away from their "down" position switch 25 opens and logic 1 is applied to the reset input of latch 134 and through amplifier 170 to set input of latch 130 but the positive-going signal does not affect the state of the latches.

As the twine tubes move toward their home position, and as they reach the position at which twine is to be wrapped circularly around the ends of the bale, the twine tube drive mechanism closes pause switch 26. The logic 0 output of the switch sets latch 136 by a circuit which extends through inverter 174, NAND 172, capacitor 238, NAND 216 and inverter 218 to the set input of latch 136. When the latch is set it again enables counter 230, this time to count the number of circular wraps around each end of the bale. The output of the latch again acts through NOR 226 and amplifier 228 to inhibit driver 126 so that the twine tubes do not move upwardly as the end wraps are made around the bale.

After the predetermined number of wraps around the ends of the bale have been counted, decoder 234 again produces an output signal to reset latch 136. When the latch is reset its output acts through NOR 226 and amplifier 228 to enable driver 126 so that the twine tubes are again driven upwardly toward the home position.

As soon as the twine tubes resume their upward movement they trip the knives for cutting the twines and also release the pause switch 26. If either one or both twines are cut NAND 176 produces a logic 1 output signal which passes through inverter 178 to block NAND 180. The logic 1 output of NAND 180 passes through inverters 182, NOR 184, inverter 222 and amplifier 224 to block driver 226 and stop upward movement of the twine tubes.

Meanwhile the release of pause switch 26 causes the output of inverter 174 to block NAND 172. The output of NAND 172 passes through inverter 173 and capacitor 175 to set latch 132. The resulting logic 1 output from latch 132 is applied through a delay element 240 to one input of NANDs 190 and 194. The purpose of delay 240 is to insure that the latch 132 does not enable the NANDs until after the knives have had time to cut the twines, and the switches 27 and 28 have had time to sense that movement of the twines has stopped.

If both twines are cut the output of NOR 186 enables one input of NAND 194 and blocks NAND 190. When the output of delay 240 goes to logic 1, NAND 194 produces a logic 0 signal which passes through inverter 242 and amplifier 244 to enable one input of driver 124. The output of NAND 194 is also applied to NAND 246. The output of NAND 246 passes through an inverter 248 and amplifier 250 to block driver 125. This blocks transistor Q5 so that the tailgate actuator is not activated to drive the tailgate down.

The tailgate foul switch 30 should be closed any time the tailgate is not fouled. Its logic output passes through inverter 146 and amplifier 147 to enable a second input of driver 124. Therefore, when the output of NAND 194 goes to logic 0 driver 124 is turned on. Its output turns on transistor Q4 and current flows through the transistor to actuate the solenoid valve which controls extension of the tailgate pistons to raise the tailgate.

As explained in the Mast patent, the first travel of the pistons relieves spring pressure from a main belt clutching idler and the bale stops turning. As the tailgate is raised, and after it is opened sufficiently to eject the bale, the belt is reclutched to drive the floor chains (70 of Mast) and eject the bale through the rear of the baler.

The tailgate continues its upward movement until it is completely open. At this point the tailgate up switch 24 is closed by the fully opened tailgate and the switch produces a logic 0 output to reset latches 134 and 132. When latch 132 is reset its output disables NAND 194 and the resulting output of NAND 194 disables driver 124 and enables NAND 246. The disabling of driver 124 stops upward movement of the tailgate.

The tailgate down switch 29 is connected through inverters 148 and 150 to the second input of NAND 246 so that this second input is enabled shortly after the tailgate begins opening. Therefore, when the output NAND 194 goes to logic 1 the output of NAND 246 passes through inverter 248 and amplifier 250 to enable one input of driver 125. The second input of the driver is enabled as long as the tailgate is not fouled, the logic 0 output of the tailgate foul switch 30 being applied through inverter 146 and amplifier 147 to the inputs of both drivers 124 and 125. The driver 125 is turned on to cause transistor Q5 to conduct. This energizes the tailgate drive mechanism to drive the tailgate toward its closed position.

Assuming that the tailgate is not fouled as it moves toward the closed position, nothing further happens until the tailgate is closed and actuates the tailgate down switch 29. The logic 0 output of the switch is inverted by inverters 148 and 150 but the logic 0 output of inverter 150 is blocked by diode 151. The capacitor 149 discharges to keep NAND 246 enabled for a short interval after switch 29 is closed. This insures that driver 125 and transistor Q5 remain energized for a short interval after switch 29 closes, thereby insuring that the tailgate is locked closed. After capacitor 149 discharges NAND 246 is blocked and this terminates the downward drive of the tailgate.

At the time the tailgate down switch 29 is closed, the negative-going output of inverter 150 passes through capacitor 152 and blocks NAND 154. The logic 1 output of NAND 154 enables NAND 144. The second input of NAND 144 is already at logic 1 because the bale complete switch opened as the bale was ejected and latch 134 was reset when the tailgate was fully raised. The logic 0 output of NAND 144 holds NAND 154 off and, through amplifier 158 disables drivers 121 and 122 to turn off the red indicator and prevent the lighting of the yellow indicator. At the same time, the logic 1 output of NAND 154 enables driver 123 to turn on the green indicator as a signal to the operator that he may put the tractor in gear to move the baler forward and begin forming another bale. It should be noted that the negative-going pulse from inverter 150 which blocks NAND 154 also passes over a lead 155 to block a NAND 302 in the indicator control circuit 155. The output of NAND 302 passes through NOR 304 and over lead 157 to reset latch 160. This blocks driver 122 and partially enables driver 121. Therefore, when the bale complete switch 23 is next actuated to turn off the green indicator after another bale has been formed, driver 121 will be fully enabled so that the yellow indicator may be turned on.

The turning on of the green indicator signals the completion of the operations required to form, wrap and eject one bale. In response to the green indicator the operator may put the tractor in gear to begin forming another bale.

Malfunction Detection

During a baling operation the logic circuit may detect non-normal or "error" conditions and upon sensing one of these conditions turn on the yellow indicator and audible alarm as a signal to the operator that he should inspect the baler and correct some problem. All of these conditions are detected during intervals when the red indicator should be on. Therefore, when the red indicator is turned off and the yellow indicator is turned on it provides an indication of an error condition. The yellow indicator is also turned on during a normal operating cycle as previously explained, but since energization of the yellow indicator during normal operation follows energization of the green indicator the operator is able to distinguish between whether the yellow indicator is a signal to prepare to stop or a signal that an error has occurred.

The logic circuit is capable of detecting when a twine is broken, when one of the twine supplies is exhausted, when a twine is not cut at the end of a wrapping sequence and when the tailgate is fouled because it has struck a bale which has not been completely ejected.

As shown in FIG. 3, the primary circuits for controlling the yellow and red indicators include latch 300. When power is first turned on, the logic 1 signal at the input of inverter 174 (FIG. 2A) passes through the inverter and over lead 177 to reset latch 300. The output of the latch blocks NAND 312 and the resulting output of latch 312 enables one input of NAND 314.

When power is turned on, the twines are not moving hence the output of NAND 180 (FIG. 2A) is at logic 1. The output of NAND 180 is inverted by inverter 182 and applied over lead 183 to an inverter 306. The output of the inverter 306 enables one input of NANDs 308 and 318. Latch 136 is reset at power turn-on and its output is applied over lead 137 to FIG. 3 where it blocks NAND 318. The output of NAND 318 enables a second input of NAND 314 and NAND 314 produces a logic 0 signal which is applied to NOR 301 and through an inverter 328 to a NAND 322.

Since latch 136 is reset at power turn-on, NAND 220 is blocked and applies a logic 1 signal over lead 221 to NOR 301. The NOR produces a logic 0 signal which is applied to one input of NOR 303.

The second input of NOR 303 is derived from NAND 324. At power turn-on latch 132 (FIG. 2A) is reset and blocks NAND 190 (FIG. 2B). The output of the NAND is applied over lead 191 to FIG. 3 where it passes through an inverter 326 and a capacitor 332 to momentarily block one input of NAND 324. The tailgate foul switch 30 is normally closed when power is turned on so inverter 146 produces a logic 1 output signal on lead 161. In FIG. 3 this signal is inverted by inverter 334 and passed through capacitor 330 to momentarily block the second input of NAND 324. The NAND produces a logic 1 output signal that is applied to NOR 303. The resulting momentary logic 0 output of NOR 159 is applied to the set input of latch 160.

The signal on lead 191 enables the second input of NAND 322 and its logic 0 output is applied to one input of NOR 304. The tailgate down switch 29 is normally closed at power turn-on. Its logic 0 output is inverted by inverters 148 and 150 and passes through capacitor 152 and over lead 155 to momentarily block NAND 302. The NAND produces a logic 1 output signal that is applied to NOR 304. The resulting logic 0 output of NOR 304 is applied over lead 157 to the reset input of latch 160.

In summary, at power turn-on logic 0 signals momentarily appear on leads 157 and 159 to simultaneously reset and set the latch 160. The latch is of the type (CD4044) wherein the logic 0 at the reset input dominates. Therefore, the latch is reset at power turn-on. As soon as capacitor 152 charges and the signal on lead 155 goes to logic 1, NAND 302 applies a logic 0 to NOR 304 and the signal on lead 157 rises to the logic 1 level. In like manner, as soon as capacitors 330 and 332 are charged NAND 324 applies a logic 0 signal to NOR 303 at which time the signal on lead 159 rises to the logic 1 level. The latch 160 remains reset because its state can be changed only by a negative-going signal.

Although latch 160 is set at power turn-on, neither the red nor yellow indicator is turned on because drivers 121 and 122 are blocked by the output of amplifier 158. When a full bale has been formed, the output of amplifier 158 enables drivers 121 and 122 as previously described and the yellow indicator is turned on. However, the input signals to the circuit of FIG. 3 do not change until both twines begin moving. NAND 180 is turned on and the output of inverter 306 blocks on input of NANDs 308 and 318. The signal from NAND 308 blocks NAND 312. Thus, both inputs of NAND 314 remain enabled.

Immediately after the signal on lead 183 goes to logic 1 the output of NAND 180 sets latch 136 and the signal on lead 137 goes to logic 1. This enables one input of NAND 318 and blocks one input of NAND 308 thereby again blocking one input of NAND 312. As latch 136 is set it enables NAND 220 and the signal on lead 221 goes to logic 0. This sets latch 300 to enable one input of NAND 312 but the second input of the NAND is still blocked.

The logic 0 signal on lead 221 causes NOR 301 to produce a logic 1 output which is inverted at NOR 303 so that a logic 0 signal is applied over lead 159 to the set input of latch 160. This sets the latch thereby turning on the red indicator as a signal to the operator that he should stop forward motion on the tractor while the bale wrapping and ejection takes place.

Assume a twine breaks or a twine supply is used up during the interval when the twine is being circularly wrapped around the bale. The NAND 180 is blocked by the output signal from one of the twine sensors and as the output of NAND 180 goes to logic 1 it acts through inverter 182 to block NAND 220. In FIG. 3, the output of NAND 220 passes over lead 221 and through NORs 301 and 303 to lead 159 thereby applying a logic 1 signal to the set input of latch 160. The output of inverter 182 passes over lead 183 and is inverted by inverter 306 to enable one input of NAND 318. The second input is already enabled because latch 136 is set thereby producing a logic 1 signal on lead 137. Therefore, NAND 318 produces an output signal which blocks NAND 314. The output of NAND 314 acts through inverter 328 to block NAND 322. The resulting logic 1 output of NAND 322 is inverted by NOR 304 so that a negative signal is applied to the reset input of latch 160. This resets latch 160 thereby turning the red indicator off and turning the yellow indicator on as a signal to the operator that he should inspect the baler for a problem.

The operator should disengage the power takeoff which provides drive power to the baler. This stops the rotation of the bale in the chamber and further stops any movement of parts in the baler. If a twine supply is exhausted the operator may install a new supply of twine, thread it through the appropriate twine sensor, and tie it to the twine already wrapped on the bale. If a twine is broken, the operator may retie the twine after making sure that it is properly threaded through the appropriate twine sensor.

After the twine is installed or retied, the operator may reengage the power takeoff to supply drive power to the baler and restart the bale rotation. As soon as the bale begins rotation the twine sensors will sense twine motion and enable NAND 180 as previously described. This will cause the signal on lead 183 to go to logic 1 so that the output of inverter 306 again blocks NAND 318. This turns on NAND 314 and its output signal is inverted by inverter 328 to enable NAND 322. The output of NAND 322 drives the output of NOR 304 to logic 1 but this signal has no effect on latch 160. However, with the signal on lead 221 and the output of NAND 314 both at logic 0, NOR 301 produces an output signal that passes through NOR 303 to set latch 160. This turns on the red indicator and turns off the yellow indicator, this being the condition prior to the time a twine supply ran out or twine was broken.

After the center circular wraps have been completed the latch 136 is reset as previously described. The signal on lead 137 goes to logic 0 thereby blocking NAND 318 whose second input is already blocked. The signal on lead 137 is inverted by inverter 316 to enable one input of NAND 308 but the other input of this NAND is already blocked. The resetting of latch 136 blocks NAND 220 so that the signal on lead 221 goes to logic 1. The output of NOR 301 acts through NOR 303 so that a logic 1 signal is applied to the set input of latch 160. Therefore, the latch does not change state at the completion of the circular wraps around the center of the bale.

As previously explained, the twine tubes move upwardly and outwardly after the circular wraps have been completed around the center of the bale. The bale is still rotating so that the twine is helically wrapped around the bale from the center toward each end. Normally, the input signals to the circuit of FIG. 3 do not change during this interval. However, if a twine should break or a twine supply should be exhausted during this interval the red indicator is turned off and the yellow indicator is turned on as a signal to the operator that he should check the baler for a problem.

When a twine breaks or a twine supply is exhausted, the signal on lead 183 drops to logic 0 and the output of inverter 306 enables one input of NAND 308. The latch 136 was reset at the completion of the center circular wraps hence a logic 0 signal has been present on lead 137 and the output of inverter 316 has been applying a logic 1 to NAND 308. When the signal on lead 183 goes to logic 0 NAND 308 is enabled and its output passes through inverter 310 to enable one input of NAND 312. The second input of NAND 312 is already enabled since latch 300 is still set. NAND 312 produces an output signal to block NAND 314. The logic 1 output of NAND 314 is applied to NOR 301 but the second input (lead 221) of this NOR is already at the logic 1 level because NAND 220 is blocked. The output of NOR 301 passes through NOR 303 and over lead 159 to apply a logic 1 signal to the set input of latch 160.

The logic 1 of NAND 314 is inverted by inverter 328 and blocks NAND 322. The resulting logic 1 output of NAND 322 is inverted by NOR 304 so that a logic 0 signal is applied to latch 160 over lead 157 to reset the latch. This turns off the red indicator and turns on the yellow indicator as a signal to the operator to inspect the baler for a malfunction.

The operator may disengage the power take-off to remove all drive power to the baler and stop the bale rotation. After the broken twine is retied or a new twine supply is installed and tied to a portion of the twine already wrapped onto the bale, the operator reengages the power take-off and the bale again begins rotation.

As soon as both twines begin moving the signal on lead 183 goes to logic 1 and the output of inverter 306 blocks NANDs 308 and 318. This enables both inputs of NAND 314 and its logic 0 output passes through inverter 328 to again enable NAND 322. The output of NAND 322 is inverted by NOR 304 so that a logic 1 signal is applied to the reset input of latch 160.

The logic 0 output of latch 314 is also applied to NOR 301. However, the second input of this NOR is at logic 1 (latch 136 is reset thereby blocking NAND 220) and the output of the NOR is inverted by NOR 303 so that a logic 1 signal is applied to the set input of latch 160.

It should be noted that since logic 1 signals are applied to both the set and reset inputs of latch 160 it remains reset to energize the yellow indicator and audible alarm. The indicator and alarm are not turned off until the helical wrap is completed and the baler is ready to start the circular wraps around the ends of the bale. At this time the pause switch 26 is closed to set latch 136 as previously described. This places a logic 1 signal on lead 137 and enables NAND 220 so that a logic 0 signal appears on lead 221. The signal on lead 183 is still at logic 1 because the twines are moving so the output of inverter 306 blocks NANDs 308 and 318. NAND 314 is thus enabled to produce a logic 0 output signal. With both inputs at logic 0, NOR 301 produces a logic 1 output which is inverted at NOR 303 and applied to the set input of latch 160 to set the latch and turn the red indicator on.

The output of NAND 314 is inverted by inverter 328 to enable NAND 322. The output of NAND 322 is inverted by NOR 304 so that a logic 1 is applied to the reset input of latch 160 at the same time its set input receives the logic 0 signal from NOR 303.

During the wrapping of the circular wraps around each end of the bale, the input signals to the circuit of FIG. 3 remain unchanged unless a twine should break or one of the twine supplies is exhausted. If either condition occurs it is detected and corrected in exactly the same manner as the detection and correction of a similar condition occurring during the wrapping of the center circular wraps.

At the completion of the circular wraps around the ends of the bale latch 136 is reset and blocks NAND 220. The output of NAND 220 passes over lead 221 and through NORs 301 and 303 so that a logic 1 level signal is applied to the set input of latch 136. The output of latch 136 passes over lead 137 to disable NAND 318. The second input of NAND 318 is still disabled, as is the NAND 308, because the twines are still moving so that the output of inverter 306 is still at logic 0. Therefore, the output of NAND 314 remains at logic 0 so that NAND 322 is enabled. The NAND 322 continues producing a logic 0 output which is inverted at NOR 304 so that a logic 1 is applied to the reset input of latch 160. Latch 160 thus remains set when latch 136 is reset.

The resetting of a latch 136 causes the twine tubes to move upwardly and immediately release the pause switch 26 and trip the knives to cut the twine as previously explained. As the pause switch is released, the output of inverter 174 drops to logic 0 and this signal is applied over lead 177 to latch 300 to reset it. This blocks NAND 312 so that NAND 314 remains enabled. Both NORs 303 and 304 continue producing logic 1 outputs so latch 160 does not change state.

Assuming that the knives operate to cut at least one twine, or operate properly to cut both twines, the signal on lead 183 goes to logic 0. This has no effect on the circuit of FIG. 3 because NAND 318 is blocked by the signal on lead 137 while the latch 300 (now reset) blocks NAND 312. These conditions insure that both inputs of NAND 314 remain enabled.

After the delay introduced by delay element 240, the output of latch 132 enables one input of NAND 190. If both twines have been cut NOR 186 is producing a logic 1 output which is inverted by inverter 188 to block NAND 190. Therefore, if the knives cut both twines the signal on lead 191 remains at the logic 1 level and the conditions of the circuit of FIG. 3 remains unchanged except that the signal on lead 183 drops to logic 0. On the other hand, if either one or both knives fail to operate, latch 160 is reset to turn on the yellow indicator and the audible alarm. In this case the output of NOR 186 is at logic 0 when the output of delay element 240 goes to logic 1 so both inputs of NAND 190 are enabled. The resulting logic 0 signal passes over lead 191 to block NAND 322. The output of NAND 322 is inverted at NOR 304 and resets latch 160 to turn on the yellow indicator and audible alarm.

The operator should at this point disengage the power take-off and correct the problem by cutting or breaking the uncut twine or twines.

When the power take-off is disengaged, the bale stops rotating and the uncut twine stops moving. The output of NOR 186 goes to logic 1 and, after inversion by inverter 188 blocks NAND 190. The resulting logic 1 signal again enables NAND 322 so that a logic 1 signal is applied to the reset input of latch 160. At the same time, the signal on lead 191 is inverted by inverter 326 and passed through capacitor 332 to momentarily block NAND 324. The logic 1 output of NAND 324 is inverted by NOR 303 and applied to the latch 160 to set it and turn the red indicator back on. As soon as capacitor 332 charges the output of NAND 324 goes to logic 0 and the signal applied to the set input of latch 160 returns to logic 1.

It should be noted that the red indicator is turned on before the uncut twine is cut by the operator. However, the turning on of the yellow indicator, coupled with the fact that the red indicator comes on when the power take-off is disengaged, informs the operator that the problem is an uncut twine.

After the twines are cut, the input signals to the circuit should remain unchanged until after the tailgate is raised, the bale is ejected and the tailgate is closed. As the tailgate is raised, the output of the tailgate down switch 29 goes to logic 1 but this has no effect on the FIG. 3 circuit because lead 155 is tied to logic 1 (FIG. 2B). When the tailgate closes the logic 0 output of the tailgate down switch is inverted by inverters 148 and 150 and passes through capacitor 152 and over lead 155 to momentarily block NAND 302. The output of NAND 302 passes through NOR 304 to reset latch 160. However, this does not turn on the yellow indicator because the pulse passing through capacitor 152 blocks NAND 154 (FIG. 2C) thus turning on the green indicator and blocking the drivers 121 and 122 which control the red and yellow indicators.

If the bale should not be fully ejected from the baler so that the tailgate strikes the bale as it closes, the yellow indicator and audible alarm are actuated. As the tailgate strikes the bale the tailgate foul switch 30 opens. The resulting logic 0 output of inverter 146 passes over lead 161 to block NAND 302 and the output of the NAND passes through NOR 304 to reset latch 160 thereby turning on the yellow indicator and alarm.

The bale may usually be freed from the tailgate by putting the tractor in gear and pulling the baler forward. As the bale clears the tailgate the tailgate foul switch closes so that the output of inverter 146 on lead 161 goes to logic 1. This signal is inverted by inverter 334 and passed through capacitor 330 to momentarily block NAND 324. The logic 1 output of the NAND is inverted by NOR 303 and sets latch 160 so that the red indicator is turned on. The state of the circuits in FIG. 3 then remains unchanged until the tailgate closes as previously described.

From the foregoing description it is seen that the present invention provides a relatively simple sensing and control means which enables a round baler having a single bale forming chamber to function practically automatically, the only operator control being the starting and stopping of the forward motion of the baler or the tractor which pulls the baler. While a preferred embodiment of the invention has been described in specific detail for purpose of illustrating the principles of the invention, it will be understood that various modifications and substitutions may be made in the described embodiment without departing from the spirit and scope of the invention as defined in the appended claims.

The embodiments of the invention in which an exclusive property or privilege is claimed are defined as follows:

1. In a round baler having a bale forming chamber into which a crop material is fed and rolled to form a bale as said baler is moved along a windrow, twine wrapping means for wrapping twine around a bale, and a tailgate mechanism including a tailgate which may be raised to permit ejection of a bale after it has been wrapped with twine, the improvement comprising:
   sensing means for sensing the condition of bale formation and the conditions of said twine wrapping means and said tailgate mechanism and producing output signals manifesting said conditions;
   indicator means; and,
   control circuit means responsive to said output signals from said sensing means for automatically controlling operation of said baler to form, wrap and eject a bale, said control circuit means including means for energizing said indicator means to signal an operator when to start and stop forward motion of said baler.

2. The improvement as claimed in claim 1 wherein said control circuit means includes means for producing an error signal when a malfunction occurs in said baler, and further indicator means responsive to said error signal for indicating to an operator that a malfunction has occurred.

3. In a round baler having only one bale forming chamber into which a crop material is fed and rolled to form a bale as said baler is moved along a windrow, twine wrapping means for wrapping twine around a bale after it has been formed in said chamber, twine severing means for severing the twine after a bale has been wrapped, and tailgate means including a tailgate which may be raised to permit ejection of a bale after it has been wrapped with twine and closed after a bale has been ejected, the improvement comprising:
   full bale sensing means;
   twine motion sensing means;
   tailgate sensing means for sensing when said tailgate is raised or closed;
   means for sensing that said twine wrapping means has completed the wrapping of a bale;
   a first indicator which, when energized, indicates to an operator that he may initiate forward motion of said baler;
   a second indicator which, when energized, indicates to an operator that he must stop forward motion of said baler; and,
   circuit means responsive to said full bale sensing means, said twine motion sensing means, said tailgate sensing means, and said means for sensing that said twine wrapping means has completed the wrapping of a bale, for selectively energizing said twine wrapping means and said tailgate means to control forming and wrapping of the bale followed by twine severing and ejection of the bale;
   said circuit means including means for energizing said first indicator when said tailgate closes and means for energizing said second indicator when said twine motion sensing means senses that said twine is in motion.

4. The improvement as claimed in claim 3 wherein said twine wrapping means comprises twine dispensing means for dispensing twine to wrap said bale, said twine dispensing means being movable between an up position and a down position whereat said twine dangles in front of, and may be caught up in the bale, and movable from said down position to said up position as the bale is being wrapped with twine;
   said circuit means including first means responsive to said full bale sensing means for energizing said twine wrapping means to drive said twine dispensing means from said up position to said down position;

further sensing means for sensing when said twine wrapping means has driven said twine dispensing means to said down position;

said circuit means including second means responsive to said further sensing means and said twine motion sensing means for inhibiting said first means and selectively energizing said twine wrapping means to drive said dispensing means toward said up position;

said circuit means including third means responsive to said means for sensing that said twine tube wrapping means has completed the wrapping of a bale for inhibiting upward movement of said twine dispensing means and energizing said tailgate means to open said tailgate.

5. The improvement as claimed in claim 4 wherein said tailgate sensing means comprises a first tailgate sensor for sensing when said tailgate is closed and a second tailgate sensor for sensing when said tailgate is open, said circuit means further including:

fourth means responsive to said second tailgate sensor for energizing said tailgate means to close said tailgate;

said means for energizing said first indicator being responsive to said first tailgate sensor; and said means for energizing said second indicator being responsive to said twine motion sensing means and said twine dispensing means for energizing said second indicator.

6. The improvement as claimed in claim 5 and further comprising a third indicator, said circuit means including means responsive to said full bale sensing means for energizing said third indicator and inhibiting the energization of said first or second indicator.

7. The improvement as claimed in claim 6 wherein said circuit means includes means for energizing said third indicator and inhibiting the energization of said first or second indicator if the twine should break, the twine supply should be exhausted, or the tailgate fouls on an incompletely ejected bale.

8. The improvement as claimed in claim 7 wherein said circuit means energizes said second indicator and inhibits energization of said first and third indicators when a broken twine is retied, an exhausted twine supply is replaced, or a fouled tailgate is freed from an ejected bale.

9. In a round baler having a bale forming chamber into which a crop material is fed and rolled to form a bale as said baler is moved along a windrow, twine wrapping means for wrapping twine around a bale, and a tailgate mechanism including a tailgate which may be raised to permit ejection of a bale after it has been wrapped with twine, the improvement comprising:

first sensing means for sensing the state of bale formation in said chamber;

first indicator means responsive to said first sensing means for signalling an operator that he should prepare to stop forward movement of said baler;

means responsive to said first sensing means for initiating operation of said twine wrapping means;

second sensing means for sensing when said twine wrapping means has terminated the wrapping of a bale with twine;

means responsive to said second sensing means for opening said tailgate whereby a bale in said chamber may pass from the interior of said chamber to the exterior thereof;

third sensing means for sensing when said tailgate is open;

means responsive to said third sensing means for closing said tailgate;

fourth sensing means for sensing when said tailgate is closed; and, second indicator means energized in response to said fourth sensing means for signalling an operator that forward movement of said baler may begin.

* * * * *